United States Patent [19]

Noble

[11] Patent Number: 5,995,290
[45] Date of Patent: Nov. 30, 1999

[54] REPLACEMENT HEADS-UP DISPLAY SYSTEM

[75] Inventor: Walter E. Noble, Baltimore, Md.

[73] Assignee: Northrop Grumman Corporation, Los Angeles, Calif.

[21] Appl. No.: 09/154,919

[22] Filed: Sep. 17, 1998

[51] Int. Cl.$^6$ .................................................. G02B 27/14
[52] U.S. Cl. ................................ 359/630; 345/7; 348/115
[58] Field of Search ............................... 359/630; 340/91; 345/7, 1, 9, 3; 348/115, 117, 121, 123

[56] References Cited

U.S. PATENT DOCUMENTS

| | | | |
|---|---|---|---|
| 3,699,511 | 10/1972 | Fletcher et al. | 340/33 |
| 3,936,148 | 2/1976 | Ellis | 350/173 |
| 4,092,716 | 5/1978 | Berg et al. | 364/424 |
| 4,749,256 | 6/1988 | Bell et al. | 350/174 |
| 4,837,664 | 6/1989 | Rodriguez, II et al. | 361/386 |
| 4,974,317 | 12/1990 | Rodriguez, II et al. | 29/841 |
| 5,241,391 | 8/1993 | Dodds | 358/209 |
| 5,307,238 | 4/1994 | Marcus | 361/681 |
| 5,519,410 | 5/1996 | Smalanskas et al. | 345/7 |
| 5,520,976 | 5/1996 | Giannetti et al. | 428/36.3 |
| 5,583,735 | 12/1996 | Pease et al. | 361/170 |
| 5,700,342 | 12/1997 | Giannetti | 156/245 |
| 5,838,262 | 11/1998 | Kershner et al. | 340/945 |

Primary Examiner—Georgia Epps
Assistant Examiner—Timothy J Thompson
Attorney, Agent, or Firm—Terry J. Anderson; Karl J. Hoch, Jr.

[57] ABSTRACT

In accordance with the present invention, there is provided a replacement heads-up display system for a vehicle flat-screen display system. The flat-screen display system including flat-screen display electronics which is connectable to a flat-screen display input connector for providing flat-screen display input signals therethrough. The flat-screen display electronics is sized and configured to be received by a flat-screen display bay formed in a vehicle control panel. The flat-screen display is attachable to a flat-screen display bezel which is attachable to the vehicle control panel. The replacement heads-up display system is provided with heads-up display electronics which is configured to mechanically and electrically interface with the flat-screen input connector. The heads-up display electronics is formed to receive and transmute the flat-screen input signals to heads-up display signals. The heads-up display electronics is sized and configured to be received by the flat-screen display bay. There is further provided a replacement bezel which is configured to replace the flat-screen bezel and is attachable to the vehicle control panel. There is further provided a heads-up display which is in electrical communication with the heads-up display electronics and is attachable to the replacement bezel. There is further provided heads-up display controls which are electrically connectable with the heads-up display electronics and are mechanically mountable to the the replacement bezel.

7 Claims, 3 Drawing Sheets

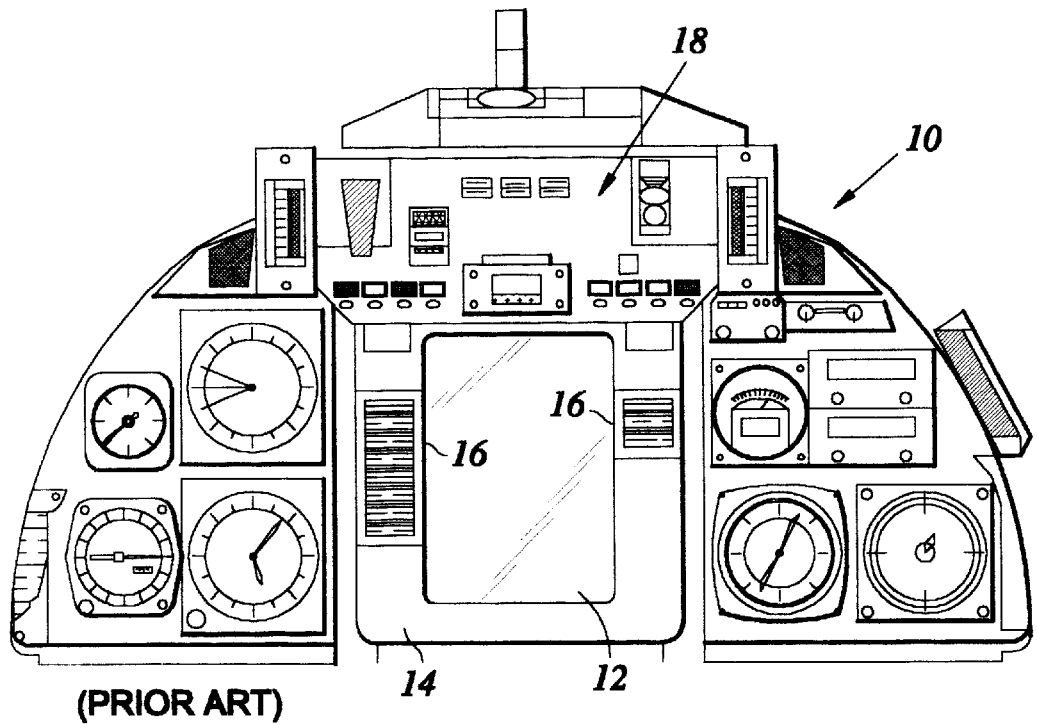
(PRIOR ART)
Fig. 1
(PRIOR ART)
Fig. 2
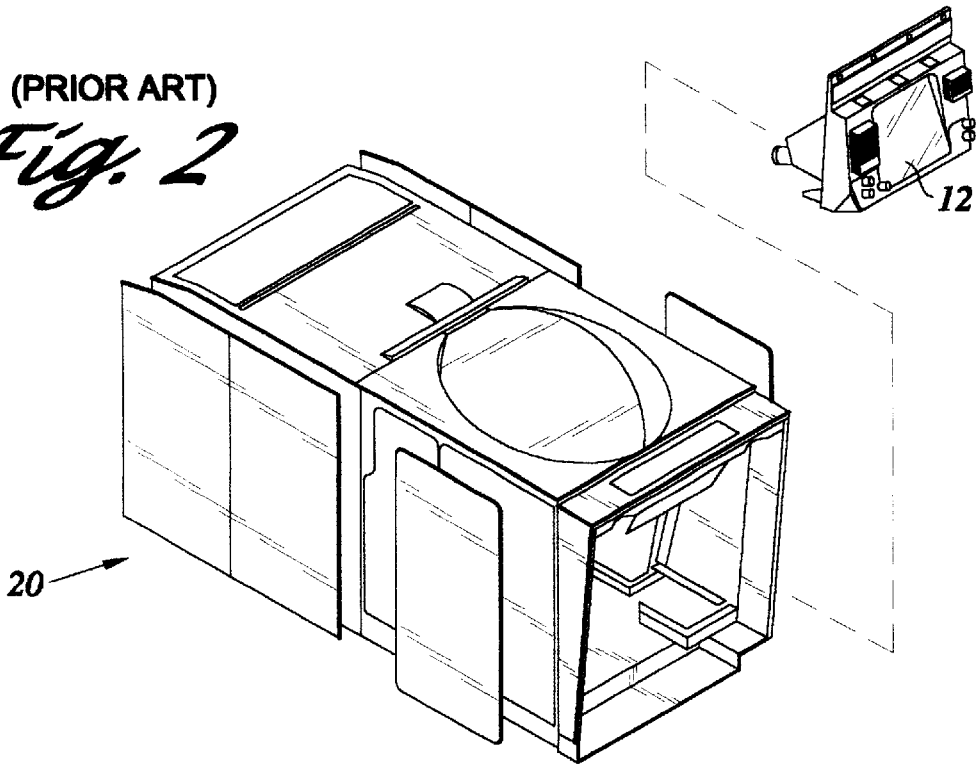

REPLACEMENT HEADS-UP DISPLAY SYSTEM

FIELD OF THE INVENTION

The present invention relates generally to heads-up display systems for aircraft and the like. The present invention relates more particularly to a replacement heads-up display system specifically configured be integrated into a control panel for the to replacement of an original or otherwise pre-existing flat-screen display thereat.

BACKGROUND OF THE INVENTION

Aircraft display systems are well known. Typical aircraft display systems are commonly located at a main instrument control panel of an aircraft cockpit, and typically utilize a flat-screen to effect the display of desired information. Such flat-screen displays include those based upon a cathode ray tube (CRT), liquid plasma, and the like.

Typically, information, such as moving map display, radar information, weather information, targeting and fire control information, and flight parameter symbology is displayed upon the flat-screen of a temporary display system.

As those skilled in the art will appreciate, however, there is a trend in modern aircraft design to incorporate heads-up displays, so as to mitigate the need for the pilot and/or other crew members to look down at the control panel in order to read the desired information. Head-up displays for use in aircraft are well known. Generally an aircraft head-up display is an optical display apparatus for projection symbology of vital flight parameters into the pilot's field of view while the pilot is sitting in the normal "heads-up" position looking out a forward portion of the windscreen in a conventional manner. A heads-up display integrates outside visual cues with internally generated images conveying aircraft performance data to assist the pilot in a variety of conditions. Such a system can provide useful and important information respecting the aircraft without requiring the pilot to divert his attention from outside the aircraft, refocus on an instrument panel, and then redirect his attention to the outside world. It will be appreciated that this is particularly important in combat situations, wherein the loss of view, even for a very short period of time, may be catastrophic. An example of an early heads-up display system is disclosed in U.S. Pat. No. 3,936,148 to Ellis and is incorporated herein by reference.

According to contemporary methodology, however, the incorporation of a heads-up display must typically be performed when the aircraft is first designed. The design and installation of after-market heads-up displays frequently require extensive, complex and costly modification to the aircraft control panel. Such after market installation of a heads-up display may also be a risky endeavor, since the possibility of damaging nearby instruments and/or electronics is substantial.

In view of the foregoing, it is desirable to provide a heads-up display system for integration into an aircraft control panel, which may be retro-fitted therein with minimal expense and effort, while further mitigating the likelihood of damaging the aircraft.

SUMMARY OF THE INVENTION

In accordance with the present invention, there is provided a replacement heads-up display system for a vehicle flat-screen display system. The flat-screen display system including flat-screen display electronics which is connectable to a flat-screen display input connector for providing flat-screen display input signals therethrough. The flat-screen display electronics is sized and configured to be received by a flat-screen display bay formed in a vehicle control panel. The flat-screen display is attachable to a flat-screen display bezel which is attachable to the vehicle control panel.

The replacement heads-up display system is provided with heads-up display electronics which is configured to mechanically and electrically interface with the flat-screen input connector. The heads-up display electronics is formed to receive and transmute the flat-screen input signals to heads-up display signals. The heads-up display electronics is sized and configured to be received by the flat-screen display bay. There is further provided a replacement bezel which is configured to replace the flat-screen bezel and is attachable to the vehicle control panel. There is further provided a heads-up display which is in electrical communication with the heads-up display electronics and is attachable to the replacement bezel. There is further provided heads-up display controls which are electrically connectable with the heads-up display electronics and are mechanically mountable to the replacement bezel.

The present invention addresses the various problems associated with prior art approaches to integrating or retrofitting a heads-up display into an pre-existing vehicle control panel equipped with a flat-screen display. The replacement heads-up display system of the present invention affords the advantages of contemporary heads-up displays, i.e., by mitigating the need for the pilot or other crew member to look down to the instrument panel while flying. More particularly, the replacement display system of the present invention is configured to be mechanically and electrically compatible with the pre-existing control panel which is originally fitted with a flat-screen display. In this regard, the heads-up display electronics is configured to mechanically and electrically interface with the flat-screen input connector for receipt of display signals therefrom. Additionally, as mentioned above, the replacement bezel is provided which is configured to attach to the control panel. In this regard, it is contemplated that the bezel may be provided with bezel connectors which sized, configured and aligned to mate with those connector portions of the control panel which had been previously configured for attachment with the original flat-screen display system. Thus, the bezel conforms to the general overall design and layout of the control panel.

As such, according to the preferred embodiment of the present invention, the original, non-heads-up display system or portions thereof may be simply removed from the control panel according to the standard procedures devised therefor and the heads-up display system of the present invention is substituted or retrofitted thereat. In this manner, the effort required to effect such replacement of the original flat-screen display is minimized with the corresponding reduction in cost associated therewith.

As mentioned above, the replacement heads-up display system is provided with heads-up display controls. Such controls, for example, may be used to vary the brightness and/or contrast of the heads-up display and also for confining and changing the contents of the heads-up display. Advantageously, the replacement bezel is specifically configured to facilitate the positioning or mounting of the heads-up display controls thereat. As such, it is contemplated that the vehicle control panel need not be modified for the attachment or placement of such heads-up display controls. In this regard, the replacement heads-up display system is a modular package which facilitates ease of integration into the vehicle control panel.

According to the preferred embodiment of the present invention, which is discussed in detail below, the replacement heads-up display system is specifically depicted for use in an aircraft forward cockpit main instrument panel, such as for an F-14. Those skilled in the art, however, will appreciate that the heads-up display electronics, the replacement bezel, and the heads-up display may similarly be configured for use in a variety of different aircraft and the like. Indeed, the replacement display system of the present invention may be configured for use in various different types of civilian and military vehicles including, but not limited to, ground base vehicles such as armored troop transports, tanks, jeeps, trucks, etc.; water-based vehicles such as boats and ships; and aircraft including both fixed-winged and rotary-winged.

These, as well as other advantages of the present invention will be more apparent from the following description and the drawings. It is understood that changes in the specific structure shown and described may be made within the scope of the claims without departing from the spirit of the invention.

BRIEF DESCRIPTION OF THE DRAWINGS

FIG. 1 is a contemporary, flat-screen display system as shown in its operable relationship with a main instrument control panel for an exemplary aircraft;

FIG. 2 is a prospective view of the flat-screen display system of FIG. 1, being shown removed from the control panel thereof and also being shown partially exploded;

DETAILED DESCRIPTION OF THE PREFERRED EMBODIMENTS

Figure 3:
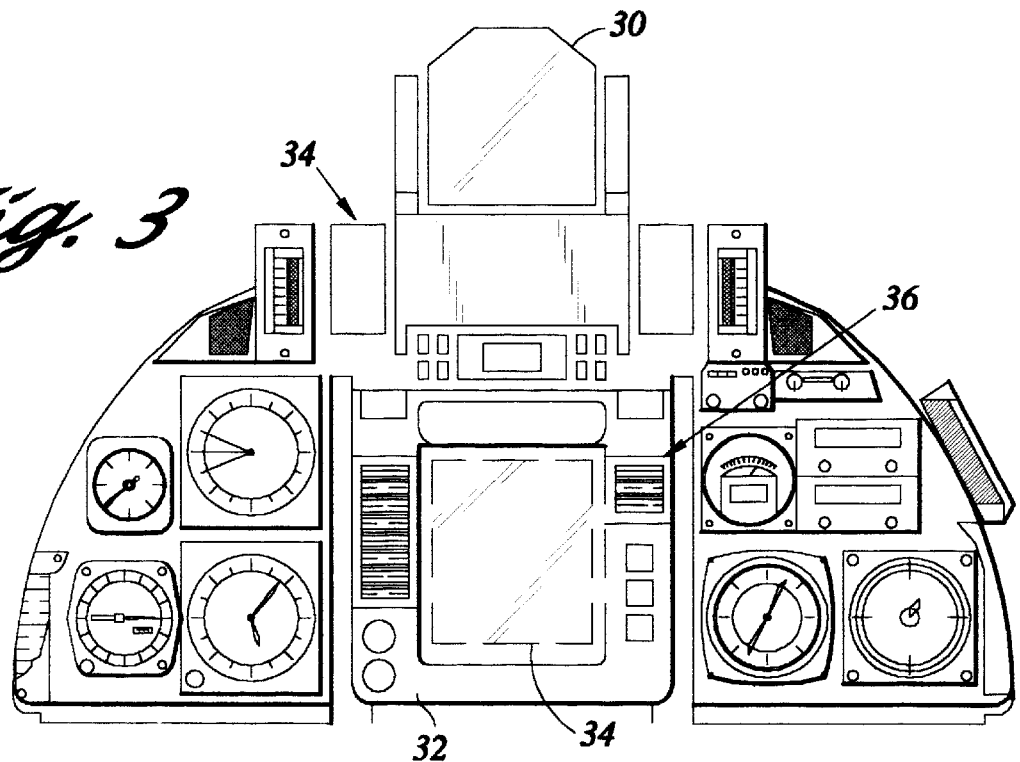
FIG. 3 symbolically depicts the flat-screen display system of FIGS. 1 and 2.
Figure 4:
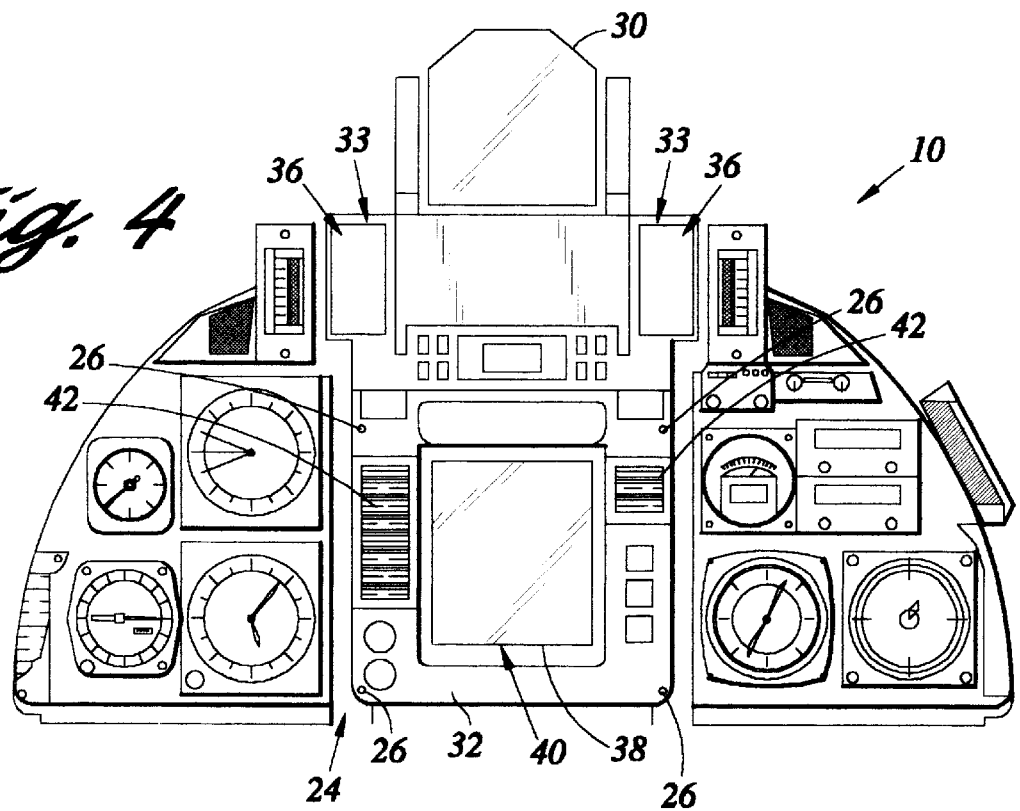
FIG. 4 depicts the control panel of FIG. 1 having the flat-screen display system removed therefrom and having the replacement heads-up display system of the present invention installed in place thereof.
Figure 5:
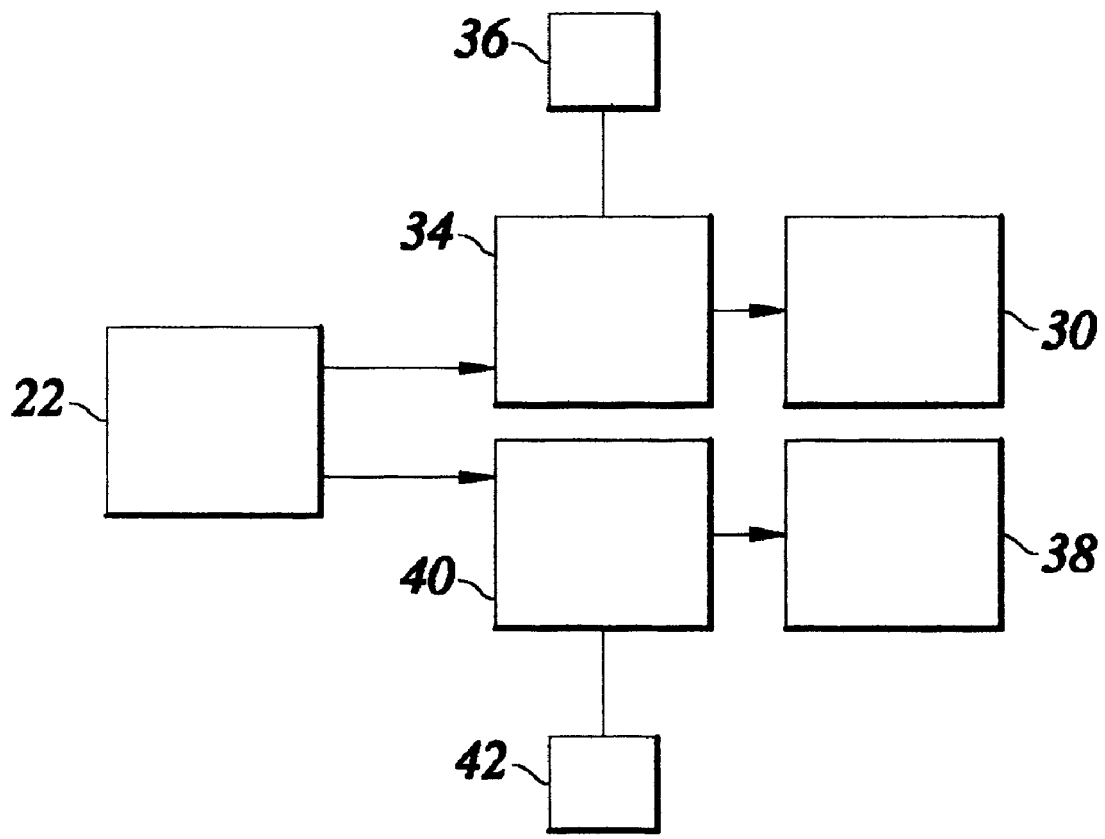
FIG. 5 symbolically depicts the heads-up display system of FIG. 4.

Referring now to the drawings wherein the showings are for purposes of illustrating a preferred embodiment of the present invention only, and not for purposes of limiting the same, FIGS. 1–3 illustrate a prior art flat-screen display system, and FIGS. 4 and 5 illustrate a replacement heads-up display system which is constructed in accordance with the present invention.

Referring now to FIGS. 1–3, a prior art forward cockpit main instrument control panel 10 is depicted. An original flat-screen display 12 is disposed approximate the center of the control panel 10 and facilitates the display of information such as moving map display, radar information, weather information, targeting and fire control information, etc. As those skilled in the art will appreciate, the original flat-screen display 12 was designed specifically for that aircraft cockpit main instrument panel 10 in which it is installed. For example, the original flat-screen display 12 as illustrated in FIG. 1 was designed specifically for the F-14 forward cockpit main instrument control panel.

The flat-screen display 12 is configured to electrically communicate with flat-screen display electronics 20. The flat-screen display electronics 20 is connectable to a flat-screen display input connector 22 for providing flat-screen display input signals therethrough according well known methods known to those of ordinary skill in the art. The flat-screen display electronics 20 is sized and configured to be received by a flat-screen display bay 24 formed in a vehicle control panel 10. An original or pre-existing flat-screen display bezel 14 surrounds the flat-screen display 12. The flat-screen display bezel 14 is attachable to the control panel 10. The flat-screen bezel 14 may be attached to the control panel 10 via use of those methods and apparatus which are well known to one of ordinary skill in the art and may include bezel connectors 26. In this respect, it is contemplated that the control panel 10 includes apparatus which is sized and configured to mate with the bezel connectors 26 for the attachment or mounting of the flat-screen display bezel 14 thereat.

As is typical, the flat-screen display bezel 14 facilitates the mounting or location of flat-screen display controls 16 for the flat-screen display 12. The flat-screen display controls 16 may control the brightness and contrast of images displayed upon the flat-screen display 12, as well as define the particular information to be displayed. In this respect, it is contemplated that the flat-screen display controls 16 electrically communicate with the flat-screen display electronics 20. The flat-screen display bezel 14 is thus formed to facilitate the physical connection between the flat-screen display controls 16 and the flat-screen display electronics 20. As such, the flat-screen display bezel 14 may include apertures 28 formed therein to facilitate such connection. In addition, various other controls and indicators 18 are disposed upon the main instrument control panel 10 above the flat-screen display 12.

Those skilled in the art will appreciate the various other configurations of the instrument control panel 10 and flat-screen display 12 are possible. For example, the flat-screen display 12 may be positioned to the left or right, so as to be primarily accessible by either the pilot or co-pilot. Further, those skilled in the art will appreciate that the type of information provided by the display will vary among different aircraft.

As discussed above, replacement of the original flat-screen display 12 and display electronics 20 with an aftermarket heads-up display typically requires substantial re-design and re-work of the instrument control panel 10, so as to accommodate new heads-up display and heads-up display electronics. Such re-design and re-work is not only expensive and time consuming, but also entails the inherent risk of damaging expensive aircraft structures and/or electronics. As those skilled in the art will appreciate, such damage may be costly to repair and also may result in undesirable down-time of the aircraft.

Referring now to FIGS. 4 and 5, the above-mentioned re-design and re-work of the control panel 10 is avoided by providing the heads-up display system of the present invention which is specifically configured to mount to the instrument panel 10 in place of the original flat-screen display 12 and display electronics 20.

The replacement heads-up display system is provided with heads-up display electronics 34 which is configured to mechanically and electrically interface with the flat-screen input connector 22. The heads-up display electronics 34 is formed to receive and transmute the flat-screen input signals to heads-up display signals. It is contemplated that the particular methods and sub-components by which the heads-up display electronics 34 receives and transmutes input signal which are suitable for use with a flat-screen display system to those which are suitable for use with a heads-up display system are chosen from those which are well known to one of ordinary skill in the art. In this respect, it is contemplated that the flat-screen input signals which are provided by the flat-screen display input connector 22 represent information which is used by the heads-up display electronics 34. For example, such information may represent data regarding mapping, radar, weather, targeting and fire control, and flight parameters. In this regard, the receipt and conversion of such input signals for use by the heads-up display 30 are contemplated to be known in the art.

There is further provided a heads-up display 30 which is in electrical communication with the heads-up display electronics 34. There is further provided heads-up display controls 36 which are electrically connectable with the heads-up display electronics 34 for controlling images associated with the heads-up display 30. The heads-up display controls 36, for example, are used to control and adjust the brightness and/or contrast of the heads-up display 30, as well as facilitate the definition of those items to be displayed thereon. It is contemplated that the components comprising the heads-up electronics 34, heads-up display 30 and heads-up display controls 36 which facilitate the operation thereof are chosen from those which are well known to one of ordinary skill in the art.

Importantly, the heads-up display electronics 34 is physically sized and configured to be received by the flat-screen display bay 24. There is further provided a replacement bezel 32 which is configured to replace the flat-screen bezel 14 and is attachable to the vehicle control panel 10. The heads-up display 30 is attachable to the replacement bezel 32 and preferably extend there above. The heads-up display controls 36 are mechanically mountable to the replacement bezel 32.

Preferably, the replacement bezel 32 is attachable to the vehicle control panel 10 via the bezel connectors 26 which were used to attach the original flat-screen bezel 14 thereat. In this respect, the replacement bezel 32 is contemplated to be sized and configured such that the bezel connectors 26 align and join with the replacement heads-up display bezel 32 and the control panel, 10 is a similar manner as that with the flat-screen display bezel 14 and the control panel 10. As such, the replacement bezel 32 facilitates ease of integration with the control panel 10 in that substantial modification of the same is not required for the attachment of the replacement bezel 32.

Preferably, the replacement heads-up display bezel 32 has control apertures 33 formed therein and the heads-up display controls 36 are mechanically attachable to the heads-up display electronics 34 through the control apertures 33.

It is contemplated that the replacement heads-up display system and components thereof of the present invention do not interfere with the accessibility of any of the original controls and indicators 18 located on the control panel 10. In fact, it is contemplated that replacement of the original flat-screen display system may provide additional control panel space for the location of additional displays, controls and indicators. In this respect, the heads-up display bezel 32 may be configured to accommodate the mounting and attachment of a non-heads-up display 38, non-heads-up display electronics 40 and non-heads-up display controls 42 associated therewith. The components comprising the non-heads-up display 38, the non-heads-up display electronics 40 and non-heads-up display controls 42 associated therewith are contemplated to be chosen from those which are well known to one of ordinary skill in the art. Thus, it is contemplated that the replacement heads-up display system may include both heads-up display and non-heads-up display technologies.

It is further contemplated that the replacement bezel 32 is configured to conform to the original lay-out and aesthetic design of the control panel 10, such that is does not interfere with the original aircraft aesthetics and such that is maintains the proper It is understood that the exemplary replacement display system described herein and shown in the drawings represents only a presently preferred embodiment of the invention. Indeed, various modifications and additions may be made to such embodiment without departing from the spirit and scope of the invention. For example, those skilled in the art will appreciate that various different original cockpit designs will necessitate the particular design configuration of the replacement display system. For example, the position of the original display and its associated electronics, will inherently dictate the design and configuration of the replacement display system. Thus, these and other modifications and additions may be obvious to those skilled in the art and may be implemented to adapt the present invention for use in a variety of different applications.

What is claimed is:

1. A replacement heads-up display system for a vehicle flat-screen display system, the flat-screen display system including flat-screen display electronics connectable to a flat-screen display input connector for providing flat-screen display input signals therethrough, the flat-screen display electronics being sized and configured to be received by a flat-screen display bay formed in a vehicle control panel, the flat-screen display being attachable to a flat-screen display bezel, the flat-screen display bezel being attachable to the vehicle control panel, the replacement heads-up display system comprising:

heads-up display electronics configured to mechanically and electrically interface with the flat-screen input connector, the heads-up display electronics being formed to receive and transmute the flat-screen input signals to heads-up display signals, the heads-up display electronics being sized and configured to be received by the flat-screen display bay;

a replacement bezel configured to replace the flat-screen bezel, the replacement bezel being attachable to the vehicle control panel;

a heads-up display in electrical communication with the heads-up display electronics, the heads-up display being attachable to the replacement bezel; and heads-up display controls electrically connectable with the heads-up display electronics for controlling the heads-up display, the heads-up display controls being mechanically mountable to the replacement bezel.

2. The replacement heads-up display system of claim 1, wherein the flat-screen display bezel being attachable to the vehicle control panel via bezel connectors and the replacement bezel being attachable to the vehicle control panel via the bezel connectors.

3. The replacement heads-up display system of claim 1, wherein the replacement bezel having control apertures formed therein and the heads-up display controls being mechanically attachable to the heads-up display electronics through the control apertures.

4. The replacement heads-up display system of claim 1, wherein the heads-up display is disposed generally above the replacement bezel.

5. The replacement heads-up display system of claim 1, wherein the replacement bezel having non-heads-up display control apertures formed therein for use with non-heads-up display controls.

6. The replacement heads-up display system of claim 1, wherein the heads-up display electronics, the replacement bezel, and the heads-up display are configured for use in an aircraft.

7. The replacement heads-up display system of claim 1, wherein the heads-up display electronics, the replacement bezel, and the heads-up display are configured for use in a cockpit main instrument panel.

* * * * *